(12) United States Patent
Chan et al.

(10) Patent No.: US 7,190,545 B2
(45) Date of Patent: Mar. 13, 2007

(54) USE OF OFFLINE SERVO TRACK WRITER TOGETHER WITH SINGLE PASS SERVO WRITING PROCESS

(75) Inventors: Kwong Tat Chan, Pleasanton, CA (US); Nikolay Ivanov, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/773,917

(22) Filed: Feb. 5, 2004

(65) Prior Publication Data

US 2005/0174679 A1    Aug. 11, 2005

(51) Int. Cl.
G11B 21/02 (2006.01)
(52) U.S. Cl. ........................................................ 360/75
(58) Field of Classification Search .................... 360/75
See application file for complete search history.

(56) References Cited

U.S. PATENT DOCUMENTS 6,519,107 B1 * 2/2003 Ehrlich et al. ................ 360/75
6,522,494 B1 * 2/2003 Magee ........................ 360/75
2004/0013011 A1 * 1/2004 Valeri ........................ 365/200

* cited by examiner

Primary Examiner—Hoa T. Nguyen
Assistant Examiner—Mitchell Slavitt
(74) Attorney, Agent, or Firm—Ben J. Yorks; Irell & Manella LLP

(57) ABSTRACT

A method for writing servo information onto a disk of a hard disk drive. The method includes writing a reference servo pattern onto a track of a disk with an off-line servo track writer. The reference servo pattern has less servo bits than the final pattern allowing the off-line writer to write in a single pass. The disk is then assembled into a hard disk drive assembly and a final servo pattern is written onto the track. The final pattern can also be written with two passes. The single pass writing process reduces the time required to write the servo information. Additionally, the off-line servo track writer can write servo on a plurality of disk at the same time, further reducing the process time for writing servo and mass producing hard disk drives.

12 Claims, 6 Drawing Sheets

USE OF OFFLINE SERVO TRACK WRITER TOGETHER WITH SINGLE PASS SERVO WRITING PROCESS

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and used to center the head 7 with the center of the track.

The fields 1–5 must be written onto the disk surfaces during the manufacturing process of the disk drive. These fields are typically written with a servo writer. In one process the fields are written onto a master disk in an off-line servo track writer. The master disk is then assembled into a hard disk drive with a number of blank disks. The assembled drive uses the servo sector written onto the master disk to write another servo sector onto all the disks including the mask disk. The second servo sector is located at a predefined time lag from the end of the first servo sector. The off-line servo track writer is capable of writing servo onto all the disks in a copy process.

The conventional servo track writer requires two passes to write servo onto the master disk. The extra pass reduces the efficiency of writing servo and increases the cost of producing the drive. Additionally, only one hard disk drive can be attached to a conventional servo track writer for the servo writing process. This requires a relatively large number of conventional servo track writers which increases the floor space and capital requirements to produce the drives.

BRIEF SUMMARY OF THE INVENTION

A method for writing servo onto a disk of a hard disk drive. The method includes writing a reference servo pattern onto a track of a disk with an off-line servo track writer. The disk is assembled into a hard disk drive and then a final servo pattern is written onto the track.

DETAILED DESCRIPTION

Disclosed is a method for writing servo information onto a disk of a hard disk drive. The method includes writing a reference servo pattern onto a track of a disk with an off-line servo track writer. The reference servo pattern has less servo bits than the final pattern allowing the off-line writer to write in a single pass. The disk is then assembled into a hard disk drive assembly and a final servo pattern is written onto the track. The final pattern can be written with two passes. The single pass writing process on the off-line servo writer reduces the time required to write the servo information. Additionally, the off-line servo track writer can write servo on a plurality of disk at the same time, further reducing the process time for writing servo and mass producing hard disk drives.

Figure 1:
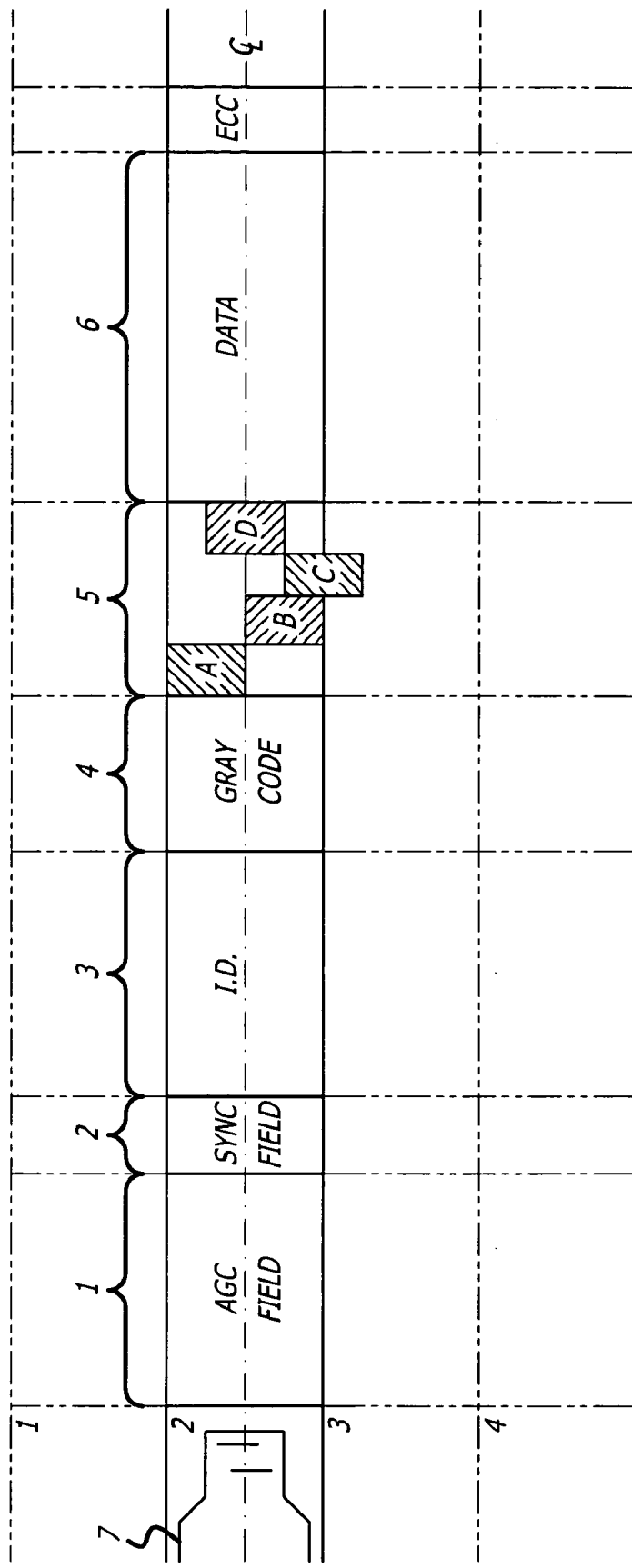
FIG. 1 is an illustration of a track of the prior art.
Figure 2:
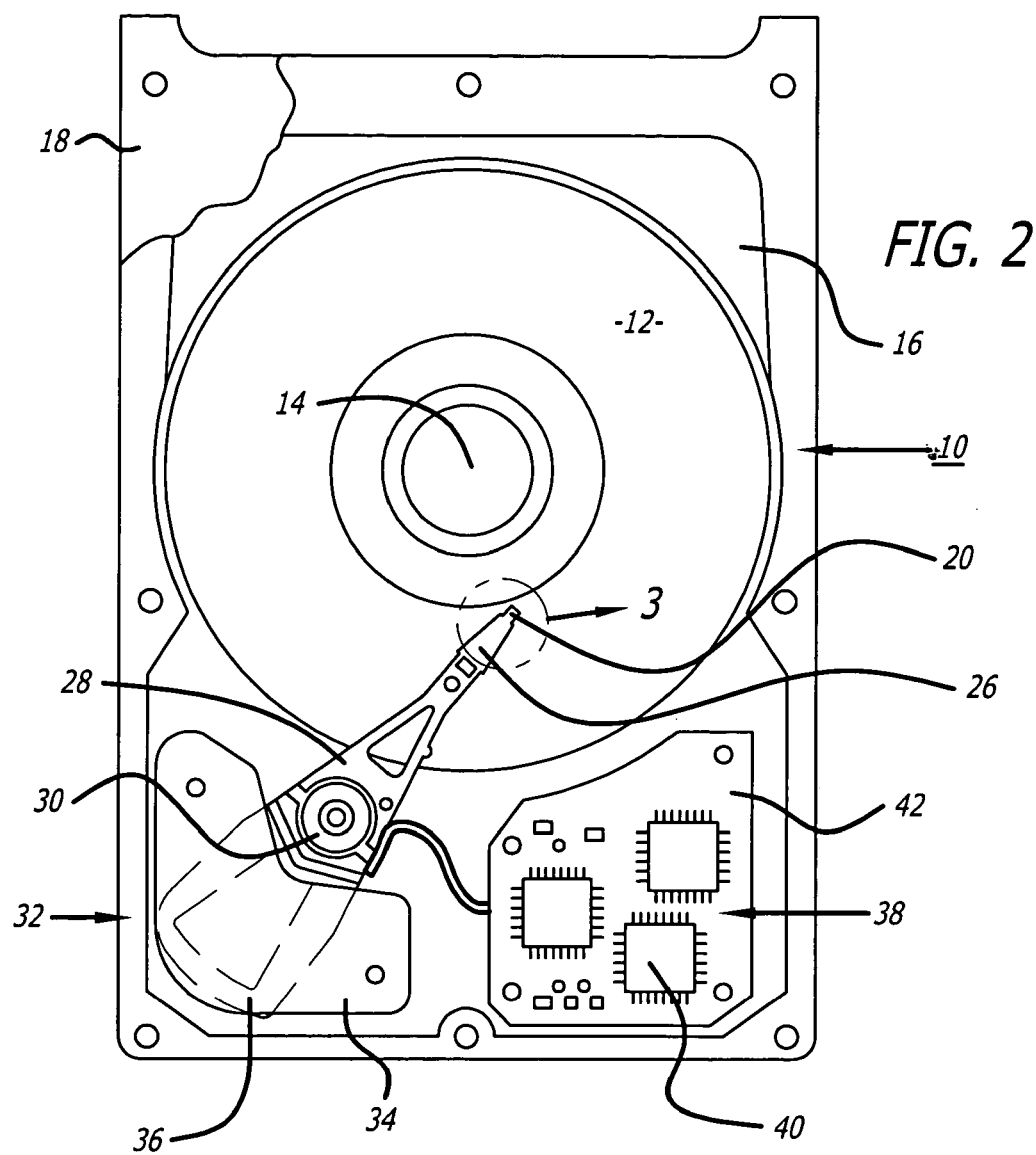
FIG. 2 is a top view of an embodiment of a hard disk drive.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
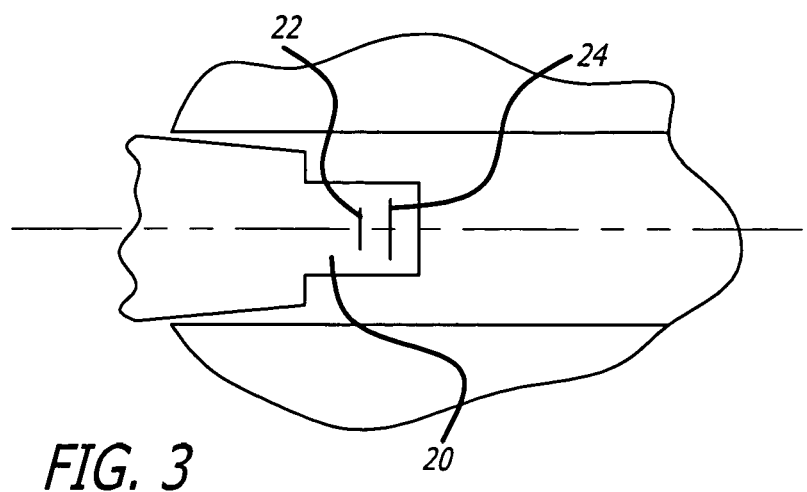
FIG. 3 is a top enlarged view of a head of the hard disk drive.

The disk drive 10 may include a plurality of heads 20 located adjacent to the disks 12. As shown in FIG. 3 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 2, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 4:
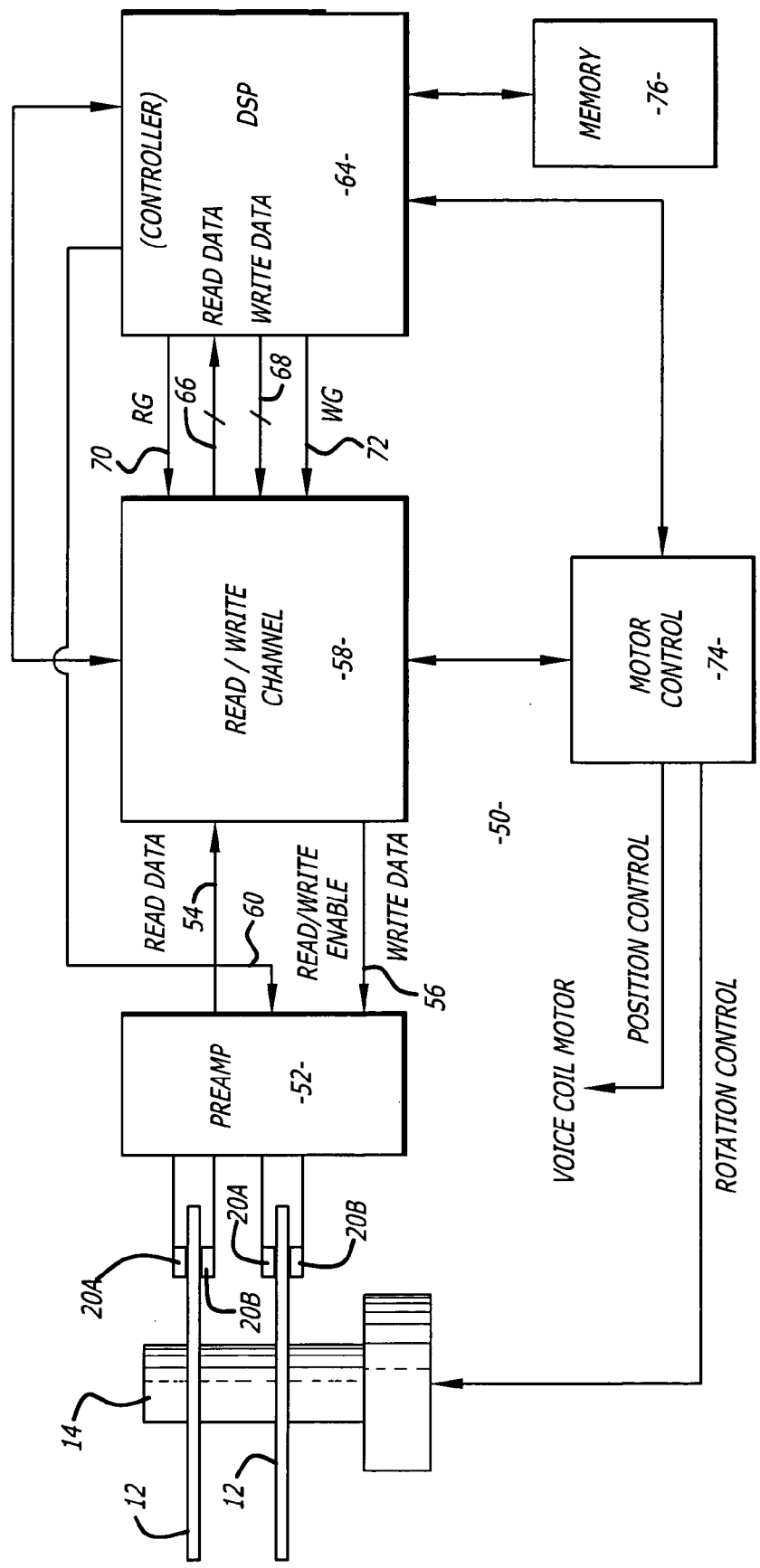
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. Each disk 12 may included a first head 20A and a second head 20B. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64. An off-line servo writer typically contains elements 14, 52 and other circuits that can write servo onto one or more disks loaded into the writer.

During the manufacturing process of the disk drive 10 servo information must be written onto the disks 12. To improve the efficiency of the servo writing process an off-line servo track writer (not shown) can be used in conjunction with a two pass copy process to write servo onto the disks 12. The process includes writing reference servo patterns onto a plurality of disks in the off-line servo track writer. The reference patterns may have less bits than the final pattern so that the off-line servo writer can write the patterns in a single pass. The single pass technique is one-half the time required to write with the two pass processes found in the prior art. Consequently, the single pass off-line servo writer can reduce by a factor of two the time required to write servo onto the disks 12. Because the off-line servo writer can write a plurality of disks at the same time, the through-put can be increased many folds depending on how many disks the equipment is designed to handle. Additionally, off-line servo writers typically contain air bearing spindle motors and a non-contact actuator to reduce runout and therefore improve the quality of the servo patterns.

After the reference patterns are written the disks can be removed from the off-line servo writer and assembled into hard disk drive assemblies that contain one or more blank disks. Each disk drive may contain one disk that has the written reference patterns. Final servo patterns are then written onto all of the disks in a drive using the reference patterns of the master disk to position the heads. The final patterns are written at a pre-defined time lag from the end of the reference servo pattern of the master disk. The final servo patterns are preferably written in two passes.

Figure 5:
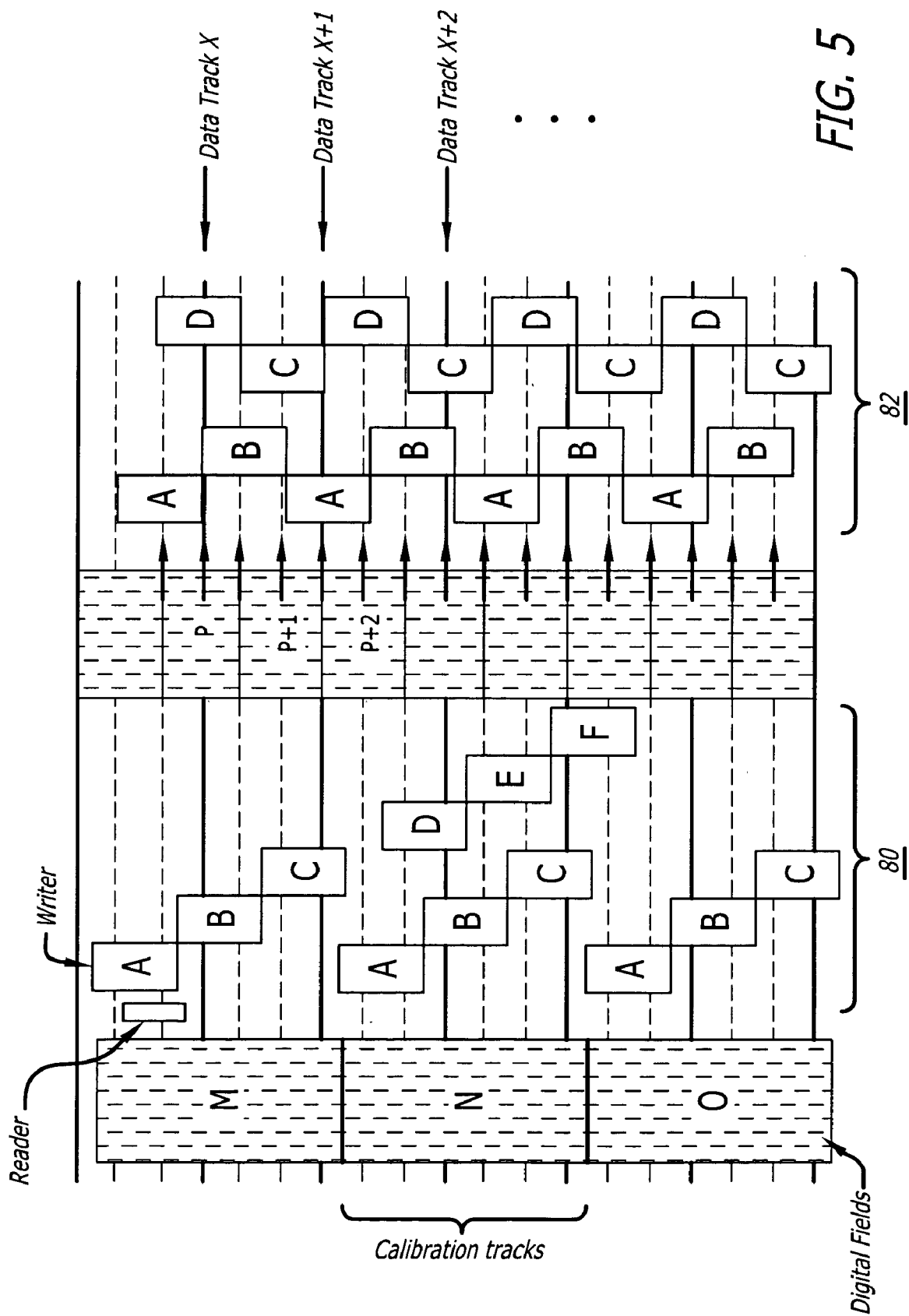
FIG. 5 is an illustration showing a reference servo pattern and a final servo pattern.

FIG. 5 shows an example of a reference servo pattern 80 and a final servo pattern 82. The reference pattern may contain only A, B and C servo bits for each track. Some of the tracks may contain a reference calibration servo pattern with A, B, C, D, E and F servo bits. The reference patterns 80 are used to orient the heads (not shown) relative to the tracks and then write the final servo patterns 82 at a pre-defined time lag from the reference pattern.

Figures 6, 7:
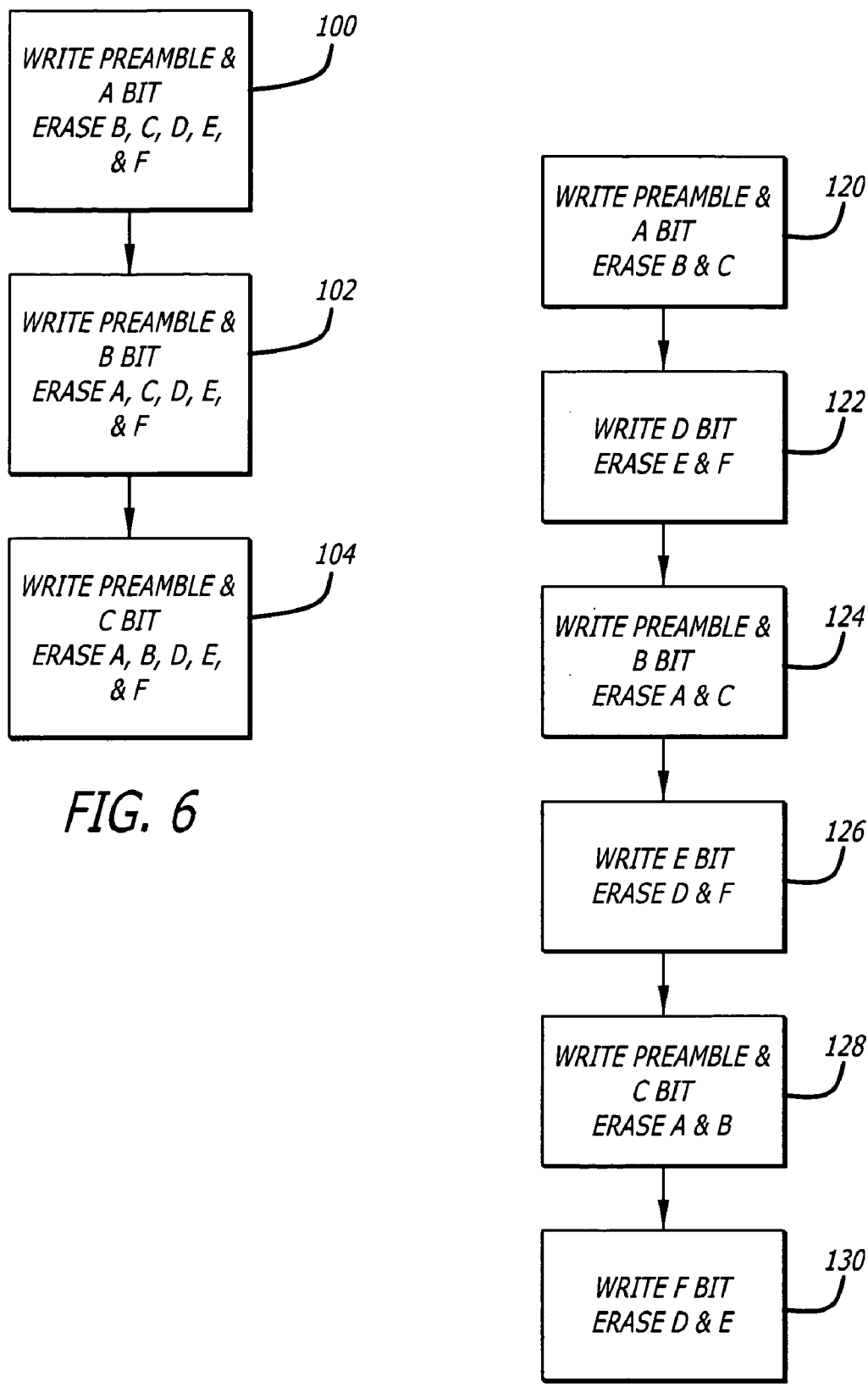
FIG. 6 is a flowchart describing a process to write a 3 burst reference servo pattern.
FIG. 7 is a flowchart describing a process to write a 6 burst reference servo pattern; and, FIG. 8 is a flowchart describing a process to write a final servo pattern.

FIG. 6 is a flowchart describing the writing of a reference pattern on a disk in an off-line servo track writer. In block 100 a preamble, servo index mark ("SIM")/servo address mark ("SAM"), servo sector number, gray code (collectively referred to as preamble) are written with an A servo bit. Servo bits B, C, D, E and F are erased.

In block 102 the preamble and servo bit B are written, while servo bits A, C, D, E and F are erased. In block 104 the preamble and servo bit C are written, and servo bits A, B, D, E and F are erased. This process is repeated across the surfaces of the disks loaded in the off-line servo writer. The heads are moved relative to the track before each write sequence in block 100–104 (see FIG. 5). By way of example, the heads may be a distance of one times the track density (eg. 1.0×tpi).

FIG. 7 is a flowchart for writing the reference calibration servo patterns onto the disks in the off-line servo writer. In block 120 the preamble is written with an A servo bit. Servo bits B and C are erased. Servo bit D is written and bits E and F are erased in block 122. In block 124 a preamble is written with a B servo bit. Servo bits A and C are erased. Servo bit E is written and bits D and F are erased in block 126. In block 128 a preamble is written with a C servo bit. Bits A and B are erased. Servo bit F is written and bits D and E are erased in block 130. This process is repeated across the surfaces of the disks loaded into the off-line servo writer. The heads are move relative to the tracks before each write sequence in blocks 120–130 (see FIG. 5). By way of example, the heads may be moved one-half the track density (eg. 0.5×tpi)

Figure 8:
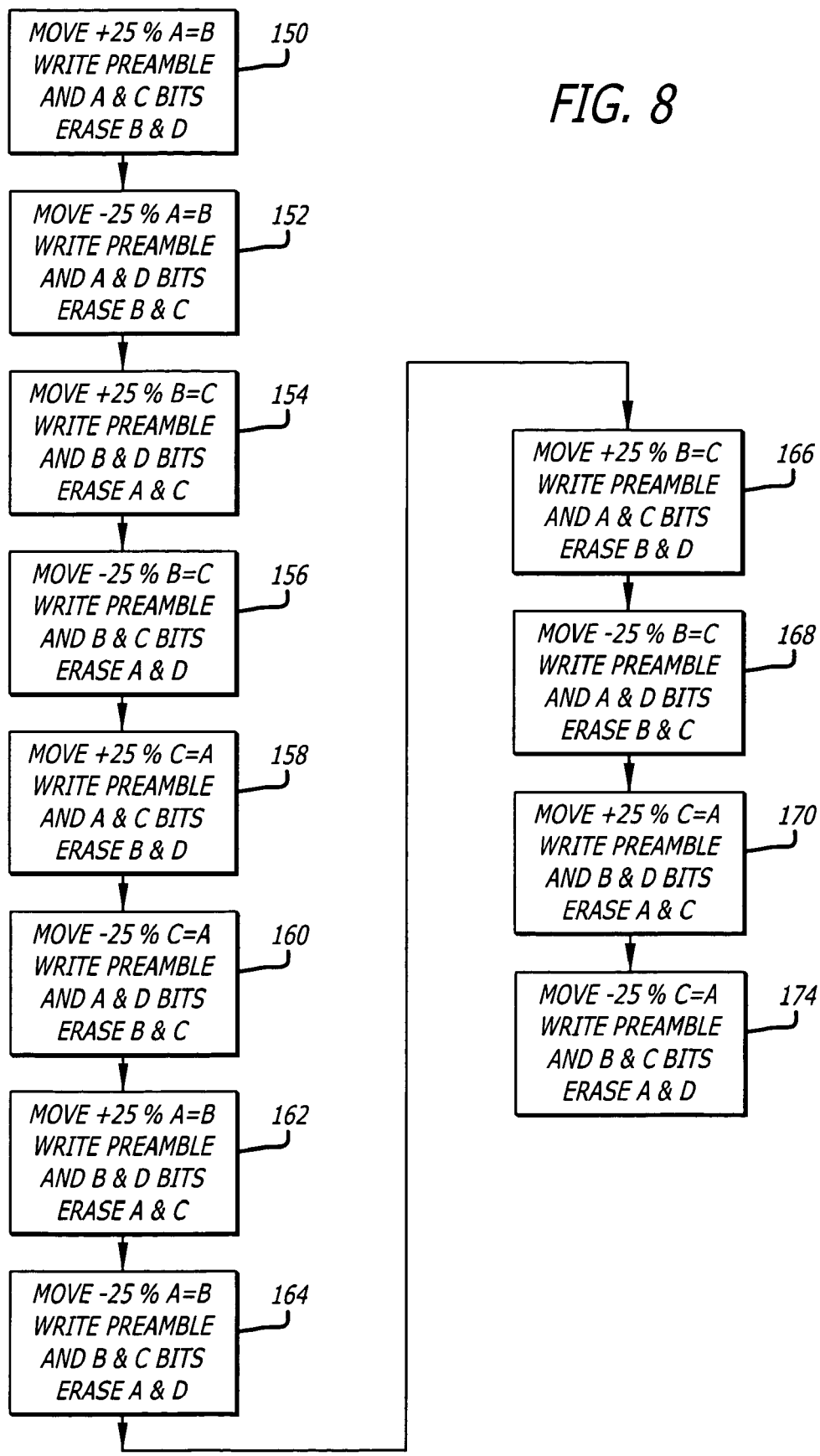

FIG. 8 is a flowchart showing the writing of the final servo patterns on the disks. In block 150 the heads are moved +25% off track from a null position where the signal from servo bit A equals the servo bit B. A preamble is written along with servo bits A and C. Servo bits B and D are erased. In block 152 the heads are moved −25% off track from the null position A=B, where a preamble is written along with servo bits A and D. Bits B and C are erased.

The heads are moved +25% off track from null position B=C and servo bits B and D are written with a preamble in block 154. Servo bits A and C are erased. In block 156 the heads are moved −25% off track from null position B=C and servo bits B and C are written with a preamble. Servo bits A and D are erased.

In block 158 the heads are moved +25% off track from a null position where C=A. A preamble is written along with servo bits A and C. Servo bits B and D are erased. In block 160 the heads are moved −25% off track from the null position C=A, where a preamble is written along with servo bits A and D. Bits B and C are erased.

The heads are moved +25% off track from null position A=B and servo bits B and D are written with a preamble in block 162. Servo bits A and C are erased. In block 164 the heads are moved −25% off track from null position A=B and servo bits B and C are written with a preamble. Servo bits A and D are erased.

In block 166 the heads are moved +25% off track from a null position B=C. A preamble is written along with servo bits A and C. Servo bits B and D are erased. In block 168 the heads are moved −25% off track from the null position B=C, where a preamble is written along with servo bits A and D. Bits B and C are erased.

The heads are moved +25% off track from null position C=A and servo bits B and D are written with a preamble in block 170. Servo bits A and C are erased. In block 172 the heads are moved −25% off track from null position C=A and servo bits B and C are written with a preamble. Servo bits A and D are erased.

This process is repeated across the surfaces of all the disks in a hard disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for writing servo information onto a disk of a hard disk drive that has a plurality of heads, comprising:
   writing a plurality of reference servo patterns onto a plurality of tracks of a plurality of disks with a plurality of heads of an off-line servo track writer;
   assembling the disk into a hard disk drive; and,
   writing a final servo pattern onto the tracks of the disk.

2. The method of claim 1, wherein each final servo pattern contains more servo bits per track than the reference servo pattern.

3. The method of claim 2, wherein each reference servo pattern includes A, B and C servo bits, and the final servo pattern includes A, B, C and D servo bits.

4. The method of claim 1, wherein each reference servo pattern is written in a single pass.

5. The method of claim 1, wherein each final servo pattern is written in two passes.

6. The method of claim 1, further comprising writing a plurality of reference calibration servo patterns onto the disk with the off-line servo track writer.

7. The method of claim 6, wherein each reference calibration servo pattern includes A, B, C, D, E and F servo bits.

8. A method for writing servo information onto a disk of a hard disk drive, comprising:
   writing a reference servo pattern onto a track of a disk in a single pass with an off-line servo track writer;
   assembling the disk into a hard disk drive; and,
   writing a final servo pattern onto the track of the disk in two passes.

9. The method of claim 8, wherein the final servo pattern contains less servo bits per track than the reference servo pattern.

10. The method of claim 9, wherein the reference servo pattern includes A, B and C servo bits, and the final servo pattern includes A, B, C and D servo bits.

11. The method of claim 8, further comprising writing a reference calibration servo pattern onto the disk with the off-line servo track writer.

12. The method of claim 11, wherein the reference calibration servo pattern includes A, B, C, D, E and F servo bits.

* * * * *